US012643093B2

(12) United States Patent
Liu et al.

(10) Patent No.: US 12,643,093 B2
(45) Date of Patent: Jun. 2, 2026

(54) NICKEL-BASED MOF FILM PHOTOCATALYST GROWN IN-SITU ON FOAMED NICKEL SURFACE, PREPARATION METHOD THEREFOR, AND APPLICATION THEREOF

(71) Applicant: GUANGDONG UNIVERSITY OF TECHNOLOGY, Guangzhou (CN)

(72) Inventors: Hongli Liu, Guangzhou (CN); Xin Ding, Guangzhou (CN); Taicheng An, Guangzhou (CN); Guiying Li, Guangzhou (CN); Huijun Zhao, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 926 days.

(21) Appl. No.: 17/904,720

(22) PCT Filed: Feb. 2, 2021

(86) PCT No.: PCT/CN2021/074814
§ 371 (c)(1),
(2) Date: Aug. 22, 2022

(87) PCT Pub. No.: WO2021/164539
PCT Pub. Date: Aug. 26, 2021

(65) Prior Publication Data
US 2023/0080563 A1 Mar. 16, 2023

(30) Foreign Application Priority Data
Feb. 21, 2020 (CN) .......................... 202010107308.1

(51) Int. Cl.
B01J 31/16 (2006.01)
B01D 53/00 (2006.01)
(Continued)

(52) U.S. Cl.
CPC ........ B01J 31/1691 (2013.01); B01D 53/007 (2013.01); B01D 53/8668 (2013.01);
(Continued)

(58) Field of Classification Search
CPC .............................. B01J 31/1691; B01J 35/39
See application file for complete search history.

(56) References Cited

FOREIGN PATENT DOCUMENTS

| CN | 105348198 | 2/2016 |
| CN | 106984190 | 7/2017 |
(Continued)

OTHER PUBLICATIONS

Bei Xue, Kezhi Li, Yao Guo, Jinhua Lu, Shengyue Gu, Leilei Zhang; "Construction of zeolitic imidazolate frameworks-derived NixCo3—xO4/reduced graphene oxides/Ni foam for enhanced energy storage performance". Journal of Colloid and Interface Science. 2019, 557, 112-123 (Year: 2019).*
(Continued)

*Primary Examiner* — Brian W Cohen
*Assistant Examiner* — Nathanael Jason Downes
(74) *Attorney, Agent, or Firm* — JMB Davis Ben-David

(57) ABSTRACT

A nickel-based MOF film photocatalyst grown in-situ on a foamed nickel surface, a preparation method therefor, and an application thereof. The nickel-based MOF film photocatalyst grown in-situ on a foamed nickel surface is prepared by first immersing foamed nickel in a diluted acid and performing ultrasonic processing, then cleaning the foamed nickel with deionized water, and drying the foamed nickel to obtain surface-activated foamed nickel; immersing the surface-activated nickel foam in a mixture of an imidazole compound, sodium formate, and a solvent and reacting at 100° C. to 180° C. to obtain an unactivated nickel-based MOFs film on the surface of the foamed nickel, and after cooling to room temperature, removing same and soaking in an
(Continued)

organic solvent to activate, and then drying the obtained product. The film photocatalyst synthesized in-situ on the foamed nickel can increase the specific surface area of the material to facilitate the adsorption and diffusion of VOCs, and can expose more catalytic sites, so that the VOCs can be effectively degraded under the action of sunlight.

6 Claims, 1 Drawing Sheet

(51) Int. Cl.

| | | |
|---|---|---|
| *B01D 53/86* | (2006.01) | |
| *B01J 23/755* | (2006.01) | |
| *B01J 35/39* | (2024.01) | |
| *B01J 35/56* | (2024.01) | |
| *B01J 37/02* | (2006.01) | |
| *B01J 37/06* | (2006.01) | |

(52) U.S. Cl.

CPC ............. *B01J 23/755* (2013.01); *B01J 35/39* (2024.01); *B01J 35/56* (2024.01); *B01J 37/0217* (2013.01); *B01J 37/0219* (2013.01); *B01J 37/0225* (2013.01); *B01J 37/0236* (2013.01); *B01J 37/06* (2013.01); *B01D 2255/20753* (2013.01); *B01D 2255/802* (2013.01); *B01D 2257/708* (2013.01); *B01D 2259/802* (2013.01)

(56) References Cited

FOREIGN PATENT DOCUMENTS

| CN | 107398187 | 11/2017 |
|---|---|---|
| CN | 107602474 | 1/2018 |
| CN | 109252180 | 1/2019 |
| CN | 111250170 | 6/2020 |

OTHER PUBLICATIONS

Zhao, Jingshu, et al. "A copper (II)-based MOF film for highly efficient visible-light-driven hydrogen production." Journal of Materials Chemistry A 4.19 (2016): 7174-7177.

Papporello, Rocio L., Eduardo E. Miró, and Juan M. Zamaro. "Secondary growth of ZIF-8 films onto copper-based foils. Insight into surface interactions." Microporous and Mesoporous Materials 211 (2015): 64-72.

\* cited by examiner

NICKEL-BASED MOF FILM PHOTOCATALYST GROWN IN-SITU ON FOAMED NICKEL SURFACE, PREPARATION METHOD THEREFOR, AND APPLICATION THEREOF

CROSS-REFERENCE TO RELATED APPLICATION

This is the U.S. National Stage of International Patent Application No. PCT/CN2021/074814 filed on Feb. 2, 2021, which claims priority to Chinese Patent Application No. 202010107308.1 filed on Feb. 21, 2020.

TECHNICAL FIELD

The present invention belongs to photocatalytic material technical field, more specifically, relates to a nickel-based MOF film photocatalyst grown in-situ on a foamed nickel surface, preparation method therefor and application thereof.

BACKGROUND

As a important pollution source for atmospheric contamination, volatile organic compounds (VOC) are not only important species involved in dust-haze and photochemical pollution as well as important precursors of secondary organic aerosols, but also have biotoxicity and "effects of mutagenesis, carcinogenesis or teratogenesis", which have become one of the three major killers of atmospheric contamination today. Therefore, how to purify VOC incurring the ever-growing pollution problems economically and effectively has become an urgent problem to be solved by the Chinese government and the public. Photocatalytic oxidation method is an emerging control technology for VOC having good application prospect, which mainly uses a semiconductor as a photocatalyst, enabling $O_2$ and $H_2O$ in air to be activated to form ·radicals of $\cdot OH^-$ and $\cdot O_2 \cdot$ having strong oxidizing property under the action of light irradiation, finally decomposing VOC into $CO_2$ and $H_2O$ without secondary pollution. However, most of the currently reported semiconductor photocatalysts could only show a photocatalytic activity under the motivation of the utilized ultraviolet light (less than 5% of sunlight), which greatly limits their practical application. On the other hand, since VOC concentration in air is actually lower, and commonly used semiconductor catalysts have small specific surface area and high recombination rate of photogenerated carriers, they have lower degrading efficiency for VOC. Therefore, developing a catalyst, which has response for visible light and could efficiently and photocatalytically degrading VOC, is currently an issue urgently need to be addressed.

Metal-organic framework (MOF) materials are a kind of organic-inorganic hybrid nano porous material having a regular structure of pore and channel formed by self-assembling metal ions with organic ligands. Compared with an inorganic porous material such as zeolite molecular sieve etc., MOF has characters such as large specific surface area, high porosity and adjustable structural property etc., which has shown good application prospect in gas storage and separation, gas adsorption, catalysis and other fields. Particularly, in an aspect of photocatalytic degradation of VOC, MOF materials show excellent photocatalytic activity. However, during practical application, MOF materials macroscopically in a powdered state may have problems such as mass transfer resistance and light shielding etc., which are not suitable for photocatalytic engineering applications of VOC in a practical environment. Therefore, the present invention provides a preparation method for a composite material, in which a nickel-based MOF thin film (abbreviated as Ni-MOF/NF) is grown in-situ on a foamed nickel by using a commercial foamed nickel having high electrical conductivity/thermal conductivity, light weight and 3D crosslinked grid structure as a substrate. This composite material is not only beneficial to increasing transparency of the photocatalyst, but also beneficial to adsorption and diffusion of VOC, and utilizing good electrical conductivity of the foamed nickel is beneficial to transmission of light-generated electrons, reducing electron-hole bulk recombination, and further improving separation efficiency of light-generated carriers, to achieve a purpose of improving photocatalytic degradation of VOC.

Up till now, there are no researches and reports relating to a nickel-based MOF film photocatalyst grown in-situ on a foamed nickel surface and application thereof in degradation of VOC.

SUMMARY

An object of the present invention is to overcome deficiencies of the prior art, and provide a nickel-based MOF film photocatalyst grown in-situ on a foamed nickel surface.

Another object of the present invention is to provide a preparation method for the above-described nickel-based MOF film photocatalyst grown in-situ on the foamed nickel surface. This method, with commercial foamed nickel as a nickel source, utilizes an etching effect of ligands constituting MOF to the foamed nickel, renders the foamed nickel to release nickel ions during hydrothermal synthesis, and subsequently utilizes the nickel ions and organic ligands to self-assemble on a surface of the foamed nickel, to grow in-situ a MOF film.

Still another object of the present invention is to provide an application of the nickel-based MOF film photocatalyst grown in-situ on the foamed nickel surface.

The above-described objects of the present invention are realized by the following technical solutions.

A nickel-based MOF film photocatalyst grown in-situ on a foamed nickel surface is prepared by first immersing the foamed nickel in a diluted acid and performing ultrasonic processing, then cleaning the foamed nickel with deionized water, and drying the foamed nickel to obtain a surface-activated foamed nickel; immersing the surface-activated foamed nickel in a mixed solution of imidazole compounds, sodium formate and a solvent, reacting at 100 to 180° C. to give rise to a coordination effect of the imidazole compounds with nickel ions released by etching the surface of the foamed nickel, so as to obtain an unactivated nickel-based MOF film on the surface of the foamed nickel, and after cooling to room temperature, taking out the unactivated nickel-based MOF film and immersing it in an organic solvent for activating, and drying the obtained product.

Preferably, the imidazole compounds are one or more of 2-methyl imidazole, imidazole, benzoimidazole or 2-ethyl imidazole.

Preferably, the dilute acid is nitric acid, hydrochloric acid or sulfuric acid; and a concentration of the dilute acid is 0.5 to 6 mol/L.

Preferably, a molar ratio of the imidazole compounds, sodium formate and the solvent is (1 to 10):1:(100 to 200).

Preferably, the solvent is one or any two of methanol, water or DMF, and the organic solvent is methanol or ethanol.

Preferably, a time for the ultrasonic processing is 5 to 60 min; a time for the reaction is 4 to 18 h; and a time for the activating is 12 to 48 h.

A preparation method for the nickel-based MOF film photocatalyst grown in-situ on the foamed nickel surface comprises the following steps:

S1. immersing the foamed nickel in a diluted acid and performing ultrasonic processing, then cleaning the foamed nickel with deionized water, and drying the foamed nickel to obtain a surface-activated foamed nickel;

S2. immersing the surface-activated foamed nickel obtained in the step S1 in a mixed solution of imidazole compounds, sodium formate and a solvent, and reacting at 100 to 180° C. to give rise to a coordination effect of the imidazole compounds with nickel ions released by etching the surface of the foamed nickel, so as to obtain an unactivated nickel-based MOF film on the surface of the foamed nickel; and S3. after cooling the obtained unactivated nickel-based MOF film on the surface of the foamed nickel to room temperature, taking out the unactivated nickel-based MOF film and immersing it in an organic solvent for activating, and drying to obtain the nickel-based MOF film photocatalyst grown in-situ on the foamed nickel surface.

The nickel-based MOF film photocatalyst grown in-situ on the foamed nickel surface is applied in degrading a volatile organic matter in air under driving of sunlight.

Preferably, the volatile organic matter is VOC discharged in paint spraying industry.

More preferably, the VOC discharged in paint spraying industry is ethyl acetate.

The present invention, with a foamed nickel having good electrical conductivity/thermal conductivity as a substrate, prepares a novel nickel-based MOF film photocatalyst material grown in-situ on the foamed nickel surface by means of a solvothermal synthesis method. This film material may efficiently catalytically degrade VOC with low concentration under driving of sunlight, and has excellent stability. This is because the MOF film is highly dispersed on the surface of the foamed nickel having big pores, which both enhances absorption to and utilization of light, and improves mass transfer of VOC. Moreover, since the electrical conductivity of the foamed nickel is beneficial to transmission of light-generated electrons, electron-hole bulk recombination is reduced, a separation efficiency of light-generated carriers can be effectively improved, and photocatalytic activity and stability of the composite photocatalyst are further improved.

Since the MOF film is grown in-situ and uniformly on the surface of the foamed nickel in this photocatalyst, large structure of pore and channel of the foamed nickel is not only beneficial to mass transfer of VOC, but also beneficial to enhancing transmission of light. At the same time, good interface contact between the electrically conductive/thermally conductive foamed nickel and the MOF is beneficial to rapid transfer of light-generated electrons, and separation of light-generated carriers is further improved, enabling the composite material to show higher photocatalytic degradation performance for VOC under driving of sunlight, which provides positive guiding significance for a visible light-responsive catalyst for efficiently and photocatalytically degrading VOC.

Compared with the prior art, the present invention has the following beneficial effects.

1. The present invention prepares the MOF photocatalyst film grown in-situ on the surface of the foamed nickel by combining MOF having a semiconductor characteristic and good adsorption ability for VOC with the foamed nickel having good electrical conductivity/thermal conductivity. Since the foamed nickel itself is directly provided as a nickel source during synthesis, additional nickel sources and other auxiliary synthesis steps are not needed, significantly improving utilization ratio of the atoms. Moreover, since the foamed nickel has large amount of three-traditional structures of pore and channel and good electron conducting ability, the composite photocatalyst provided by the present invention has better transparency, more rapid molecular mass transfer and separation ability for light-generated carriers in comparison with the corresponding powdered nickel-based MOF.

2. The nickel-based MOF film photocatalyst grown in-situ on the surface of the foamed nickel prepared in the present invention shows a certain adsorption ability and excellent catalysis activity for a typical VOC, ethyl acetate. Experimental results for adsorption in the dark show that, composite material reaches the equilibrium of adsorption and desorption of ethyl acetate within 60 min. The photocatalytic experimental results show that, the composite material still has a degrading efficiency for a gas-phase ethyl acetate up to 95% after 360 min, and the corresponding mineralization rate still maintains at 40%. The preparation for this composite catalyst provides a new thought for designing efficient photocatalyst for VOC, and also provides scientific thought for engineering application thereof.

DETAILED DESCRIPTION OF EMBODIMENTS

The present invention will be further described below in combination with drawings and specific Examples in specification, which should not be interpreted as limits to the present invention. Unless otherwise specified, technical means in Examples are technical means well known by those skilled in the art. Unless otherwise specified, reagents, methods and apparatuses adopted in the present invention are conventional reagents, methods and apparatuses in this technical field.

Example 1

1. Dilute hydrochloric acid (0.5 mol/L) and deionized water are used respectively for immersing and ultrasonically processing a foamed nickel with a dimension of 1 cm². Stain, oxidized film and organic matter etc. on the surface of the foamed nickel are washed off to expose the fresh surface of the foamed nickel. Then, the washed foamed nickel is put in a vacuum drying oven at 60° C. and dried to obtain a surface-activated foamed nickel.

2. The surface-activated foamed nickel is immersed in a mixed solution of 2-methyl imidazole, methanol and sodium formate with a molar ratio of 1:1:100 within a reaction still with polytetrafluoroethylene. The reaction still is placed in a baking oven with a program set up. The temperature within the baking oven is raised to 120° C. at 1° C./min, and the baking oven is maintained at this temperature for 12 h. After the reaction is completed, the temperature in the baking oven is decreased to room temperature, to obtain an unactivated nickel-based MOF film grown on the surface of the foamed nickel.

3. The obtained unactivated nickel-based MOF film grown on the surface of the foamed nickel is first washed alternately with alcohols and deionized water, and then placed in a vacuum drying oven at 120° C. to dry for 24 h to obtain a nickel-based MOF film photocatalyst grown in-situ on the foamed nickel (Ni-MOF/NF).

Figure 1:
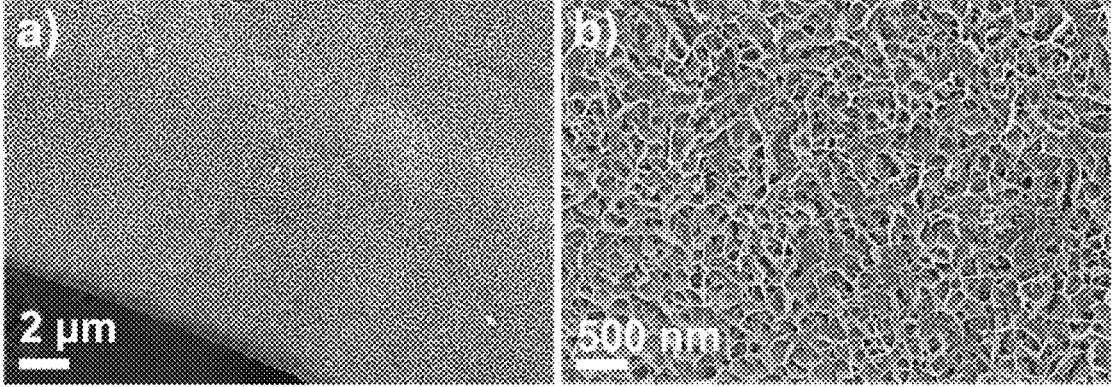
FIG. 1 is SEM photographs for the Ni-MOF/NF prepared in Example 1.
Figure 2:
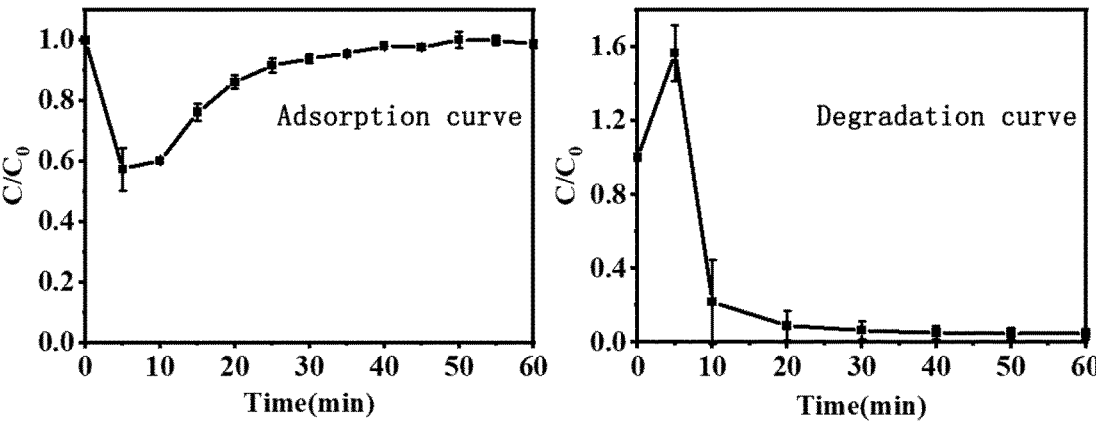
FIG. 2 is a kinetic curve for adsorption and a kinetic curve for photocatalytic degradation of the Ni-MOF/NF film photocatalyst prepared in Example 1 for the gas-phase ethyl acetate.

FIG. 1 is SEM photographs for the Ni-MOF/NF prepared in Example 1. It can be seen from FIG. 1 that, the nickel-based MOF material is grown in-situ on the foamed nickel and uniformly distributed in a state of pieces. FIG. 2 is a kinetic curve for adsorption and a kinetic curve for photocatalytic degradation of the nickel-based MOF film photocatalyst synthesized in-situ on the surface of the foamed nickel (Ni-MOF/NF) prepared in the present Example for the gas-phase ethyl acetate. It can be seen from FIG. 2 that, the adsorption of Ni-MOF/NF for ethyl acetate reaches the equilibrium of adsorption and desorption within 60 min, and the photocatalytic degradation efficiency of Ni-MOF/NF for the gas-phase ethyl acetate reaches 95% within 60 min. Results show that this nickel-based MOF film photocatalyst has a certain adsorption performance, and has very high photocatalytic activity. The nickel-based MOF film photocatalyst grown in-situ on the foamed nickel surface is a novel material having certain adsorption ability for VOC and high photocatalytic activity.

Example 2

1. Dilute hydrochloric acid (6 mol/L) and deionized water are respectively used for immersing and ultrasonically processing a foamed nickel with a dimension of 1 cm². Stain, oxidized film and organic matter etc. on the surface of the foamed nickel are washed off to expose the fresh surface of the foamed nickel. Then, the washed foamed nickel is put in a vacuum drying oven at 60° C. and dried to obtain a surface-activated foamed nickel.

2. The surface-activated foamed nickel is immersed in a mixed solution of 2-methyl imidazole, methanol and sodium formate with a molar ratio of 10:1:200, and the same is added in a reaction still with polytetrafluoroethylene. The reaction still is placed in a baking oven with a program set up. The temperature within the baking oven is raised to 100° C. at 5° C./min, and the baking oven is maintained at this temperature for 12 h. After the reaction is completed, the temperature in the baking oven is decreased to room temperature, to obtain an unactivated nickel-based MOF film grown on the surface of the foamed nickel.

3. The obtained unactivated nickel-based MOF film grown on the surface of the foamed nickel is first washed alternately with alcohols and deionized water, and then placed in a vacuum drying oven at 120° C. to dry for 24 h to obtain a nickel-based MOF film photocatalyst grown in-situ on the foamed nickel surface.

Example 3

1. Dilute hydrochloric acid (3 mol/L) and deionized water are used respectively for immersing and ultrasonically processing a foamed nickel with a dimension of 1 cm². Stain, oxidized film and organic matter etc. on the surface of the foamed nickel are washed off to expose the fresh surface of the foamed nickel. Then, the washed foamed nickel is put in a vacuum drying oven at 60° C. and dried to obtain a surface-activated foamed nickel.

2. The surface-activated foamed nickel is immersed in a mixed solution of imidazole, DMF and sodium formate with a molar ratio of 5:1:150, and the same is added in a reaction still with polytetrafluoroethylene. The reaction still is placed in a baking oven with a program set up. The temperature within the baking oven is raised to 180° C. at 10° C./min, and the baking oven is maintained at this temperature for 4 h. After the reaction is completed, the temperature in the baking oven is decreased to room temperature, to obtain an unactivated nickel-based MOF film grown on the surface of the foamed nickel.

3. The obtained unactivated nickel-based MOF film grown on the surface of the foamed nickel is first washed alternately with alcohols and deionized water, and then placed in a vacuum drying oven at 120° C. to dry for 24 h to obtain a nickel-based MOF film photocatalyst grown in-situ on the foamed nickel surface.

Example 4

1. Dilute nitric acid (1 mol/L) and deionized water are used respectively for immersing and ultrasonically processing a foamed nickel with a dimension of 4 cm². Stain, oxidized film and organic matter etc. on the surface of the foamed nickel are washed off to expose the fresh surface of the foamed nickel. Then, the washed foamed nickel is put in a vacuum drying oven at 80° C. and dried to obtain a surface-activated foamed nickel.

2. The surface-activated foamed nickel is immersed in a mixed solution of benzoimidazole, methanol and sodium formate with a molar ratio of 2:1:150, and the same is added in a reaction still with polytetrafluoroethylene. The reaction still is placed in a baking oven with a program set up. The temperature within the baking oven is raised to 140° C. at 3° C./min, and the baking oven is maintained at this temperature for 12 h. After the reaction is completed, the temperature in the baking oven is decreased to room temperature, to obtain an unactivated nickel-based MOF film grown on the surface of the foamed nickel.

3. The obtained unactivated nickel-based MOF film grown on the surface of the foamed nickel is first washed alternately with alcohols and deionized water, and then placed in a vacuum drying oven at 120° C. to dry for 48 h to obtain a nickel-based MOF film photocatalyst grown in-situ on the foamed nickel surface.

Example 5

1. Dilute sulfuric acid (with a concentration of 4 mol/L) and deionized water are used for respectively immersing and ultrasonically processing a foamed nickel with a dimension of 4 cm². Stain, oxidized film and organic matter etc. on the surface of the foamed nickel are washed off to expose the fresh surface of the foamed nickel. Then, the washed foamed nickel is put in a vacuum drying oven at 80° C. and dried to obtain a surface-activated foamed nickel.

2. The surface-activated foamed nickel is immersed in a mixed solution of 2-ethyl imidazole, water and sodium formate with a molar ratio of 10:1:200, and the same is added in a reaction still with polytetrafluoroethylene. The reaction still is placed in a baking oven with a program set up. The temperature within the baking oven is raised to 140° C. at 0.5° C./min, and the baking oven is maintained at this temperature for 18 h. After the reaction is completed, the temperature in the baking oven is decreased to room temperature, to obtain an unactivated nickel-based MOF film grown on the surface of the foamed nickel.

3. The obtained unactivated nickel-based MOF film grown on the surface of the foamed nickel is first washed alternately with alcohols and deionized water, and then placed in a vacuum drying oven at 150° C. to dry for 24 h to obtain a nickel-based MOF film photocatalyst grown in-situ on the foamed nickel surface.

The above-described Examples are preferred embodiments of the present invention, but embodiments of the present invention are not limited to the above-described Examples, and any other changes, modifications, substitutions, combinations and simplifications made without departing from the spirits and the principle of the present invention should all be equivalent replacing modes, and are all included in the protection scope of the present invention.

The invention claimed is:

1. A method for synthesizing a nickel-based MOF film photocatalyst grown in-situ on a foamed nickel surface, characterized in that, the nickel-based MOF film photocatalyst grown in-situ on the foamed nickel surface is prepared by first immersing the foamed nickel in a diluted acid and performing ultrasonic processing, then cleaning the foamed nickel with deionized water, and drying the foamed nickel to obtain a surface-activated foamed nickel; immersing the surface-activated foamed nickel in a mixed solution of imidazole compounds, sodium formate and a solvent, reacting at 100 to 180° C. to give rise to a coordination effect of the imidazole compounds with nickel ions released by etching the surface of the foamed nickel, so as to obtain an unactivated nickel-based MOF film on the surface of the foamed nickel, and after cooling to room temperature, taking out the unactivated nickel-based MOF film and immersing it in an organic solvent for activating, and drying the obtained product.

2. The method according to claim 1, characterized in that, the imidazole compounds are one or more of 2-methyl imidazole, imidazole, benzoimidazole or 2-ethyl imidazole.

3. The method according to claim 1, characterized in that, the dilute acid is nitric acid, hydrochloric acid or sulfuric acid; and a concentration of the dilute acid is 0.5 to 6 mol/L.

4. The method according to claim 1, characterized in that, a molar ratio of the imidazole compounds, sodium formate and the solvent is (1 to 10):1:(100 to 200).

5. The method according to claim 1, characterized in that, the solvent is one or any two of methanol, water or DMF, and the organic solvent is methanol or ethanol.

6. The method according to claim 1, characterized in that, a time for the ultrasonic processing is 5 to 60 min; a time for the reaction is 4 to 18 h; and a time for the activating is 12 to 48 h.

* * * * *